US012566744B2

(12) United States Patent
Ayoub et al.

(10) Patent No.: US 12,566,744 B2
(45) Date of Patent: Mar. 3, 2026

(54) PERFORMING MULTITASK MODEL TUNING AT EDGE LOCATIONS

(71) Applicant: International Business Machines Corporation, Armonk, NY (US)

(72) Inventors: Maroon Ayoub, Fassuta (IL); Nir Rozenbaum, Yoqneam Illit (IL)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 18/420,512

(22) Filed: Jan. 23, 2024

(65) Prior Publication Data

US 2025/0238412 A1 Jul. 24, 2025

(51) Int. Cl.
*G06F 16/00* (2019.01)
*G06F 16/22* (2019.01)
*G06F 40/284* (2020.01)

(52) U.S. Cl.
CPC ........ *G06F 16/2237* (2019.01); *G06F 40/284* (2020.01)

(58) Field of Classification Search
CPC ..... G06F 16/2237; G06F 16/21; G06F 40/284
See application file for complete search history.

(56) References Cited

U.S. PATENT DOCUMENTS 10,990,850 B1 4/2021 Chen et al.
11,048,978 B2 6/2021 Rabinovich et al.

11,308,077 B2 * 4/2022 Haim .................... G06F 18/214
11,676,008 B2 * 6/2023 Sandler ................. G06N 3/084
706/20
2020/0272899 A1 8/2020 Dunne et al.
2023/0325725 A1 * 10/2023 Lester ............... G06V 10/7747

OTHER PUBLICATIONS

Shen et al., "Multitask Vision-Language Prompt Tuning," arXiv, 2022, 14 pages, retrieved from https://arxiv.org/abs/2211.11720.
Bari et al., "SPT: Semi-Parametric Prompt Tuning for Multitask Prompted Learning," arXiv, 2022, 16 pages, retrieved from https://arxiv.org/abs/2212.10929.
Asai et al., "ATTEMPT: Parameter-Efficient Multi-task Tuning via Attentional Mixtures of Soft Prompt," Proceedings of the 2022 Conference on Empirical Methods in Natural Language Processing, Dec. 2022, pp. 6655-6672.
Ghosh, B., "Vector Databases for Gen AI Applications," Medium, Sep. 30, 2023, 22 pages, retrieved from https://medium.com/@bijit211987/power-of-vector-databases-for-gen-ai-applications-a63d4cf7e352.

(Continued)

*Primary Examiner* — Alexandria Y Bromell
(74) *Attorney, Agent, or Firm* — Zilka-Kotab, P.C.

(57) ABSTRACT

A computer-implemented method, according to one approach, includes: receiving a user dataset having textual entries, and sampling a number of the textual entries in the received user dataset. The textual entries sampled from the user dataset are applied to an encoding model that corresponds to a given large language model architecture. The vectors that are produced by the encoding model are combined. The combined vectors are further sent to a vector database. In response, one or more public datasets are received from the vector database, the one or more public datasets being a closest match to the combined vectors.

21 Claims, 7 Drawing Sheets

(56) References Cited

OTHER PUBLICATIONS

Wu et al., "Multi-Source Selection Transfer Learning with Privacy-Preserving," Neural Processing Letters, 2022, pp. 4921-4950.

Zhong et al., "Adapting Language Models for Zero-shot Learning by Meta-tuning on Dataset and Prompt Collections," arXiv, 2021, 26 pages, retrieved from https://arxiv.org/pdf/2104.04670.pdf.

Wang et al., "Multitask Prompt Tuning Enables Parameter-Efficient Transfer Learning," ICLR, 2023, 16 pages.

Tejada et al., "Selection of Statistically Representative Subset from a Large Data Set," CIARP 2016, Lecture Notes in Computer Science, vol. 10125, 2017, pp. 476-483.

Weaviate, "The easiest way to build and scale AI applications," Weaviate, 2024, 6 pages, retrieved from https://weaviate.io/.

IBM, "What is prompt-tuning?" IBM Blog, Feb. 15, 2023, 7 pages, retrieved from https://research.ibm.com/blog/what-is-ai-prompt-tuning.

Caruana, R., "Multitask Learning," Machine Learning, 1997, pp. 41-75.

Wikipedia, "Multi-task learning," Wikipedia, 2023, 5 pages, retrieved from https://en.wikipedia.org/wiki/Multi-task_learning.

* cited by examiner

100

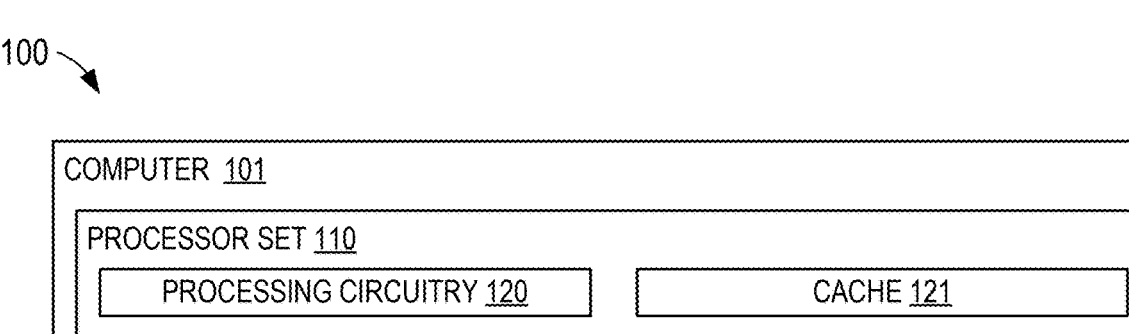

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

IMPROVED MODEL TRAINING CODE

150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

PERFORMING MULTITASK MODEL TUNING AT EDGE LOCATIONS

BACKGROUND

The present invention relates to multitask model tuning, and more specifically, this invention relates to performing multitask model tuning at edge locations.

As computing power continues to advance and the use of IoT devices becomes more prevalent, the amount of data being produced continues to increase. For instance, the prevalence of computer systems has increased with the advancement of the Internet, and wireless network standards such as Bluetooth and Wi-Fi. Additionally, the rise of smart enterprise endpoints has led to large amounts of data being generated at remote locations. Data production will only further increase with the growth of 5G networks and an increased number of connected mobile devices.

As data production increases, so does the overhead associated with processing the larger amounts of data. Processing overhead is further increased when dealing with unstructured data and as different types of information are involved. For example, video and audio data may be combined in a pool of unstructured data, which results in longer processing times. While artificial intelligence (AI) has been developed in an attempt to combat this rise in processing overhead, advancements in AI have caused the complexity of machine learning models to increase. Increasingly complex machine learning models translate to more intense workloads and increased strain associated with applying the models to received data. The operation of conventional implementations has thereby been negatively impacted.

Cloud computing has been implemented in an effort to improve the ability to perform computationally intense operations and process an increasing amount of data. For instance, cloud locations can be tailored to provide a dynamic level of computational throughput which adjusts to meet a client's needs. While this is effective in preventing processing bottlenecks from developing, it involves sending all data being analyzed to a centralized location, such as a data center or public cloud location. Sending data to a centralized location exposes it to unwanted attacks and unintentional mishandling, thereby significantly increasing the risk of data loss. However, client locations are often unable to handle the intense processing and data storage constraints associated with developing or even maintaining a functional AI model that is capable of analyzing a large amount of data. It follows that conventional systems have been forced to choose between data security and processing capabilities, causing them to suffer from operational and performance based inefficiencies.

SUMMARY

A computer-implemented method (CIM), according to one approach, includes: receiving a user dataset having textual entries, and sampling a number of the textual entries in the received user dataset. The textual entries sampled from the user dataset are applied to an encoding model that corresponds to a given large language model architecture. The vectors that are produced by the encoding model are combined. The combined vectors are further sent to a vector database. In response, one or more public datasets are received from the vector database, the one or more public datasets being a closest match to the combined vectors.

A computer program product (CPP), according to another approach, includes: a set of one or more computer-readable storage media. The CPP also includes program instructions that are collectively stored in the set of one or more storage media. Moreover, the program instructions are for causing a processor set to perform the foregoing CIM.

A computer system (CS), according to yet another approach, includes: a processor set, and a set of one or more computer-readable storage media. The CS further includes program instructions that are collectively stored in the set of one or more storage media. The program instructions are for causing the processor set to perform the foregoing CIM.

A CIM according to another approach, is for creating a vector database. The CIM includes: receiving public datasets which include textual entries. For each of the received public datasets, a number of the textual entries in the given public dataset are sampled. The sampled textual entries from the given public dataset are applied to encoding models that correspond to predetermined large language model architectures. Vectors that are produced by the encoding models are further used to create the vector database.

A CPP according to still another approach is for creating a vector database. The CPP includes: a set of one or more computer-readable storage media, and program instructions. The program instructions are collectively stored in the set of one or more storage media, and are for causing a processor set to perform the CIM above.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2A:
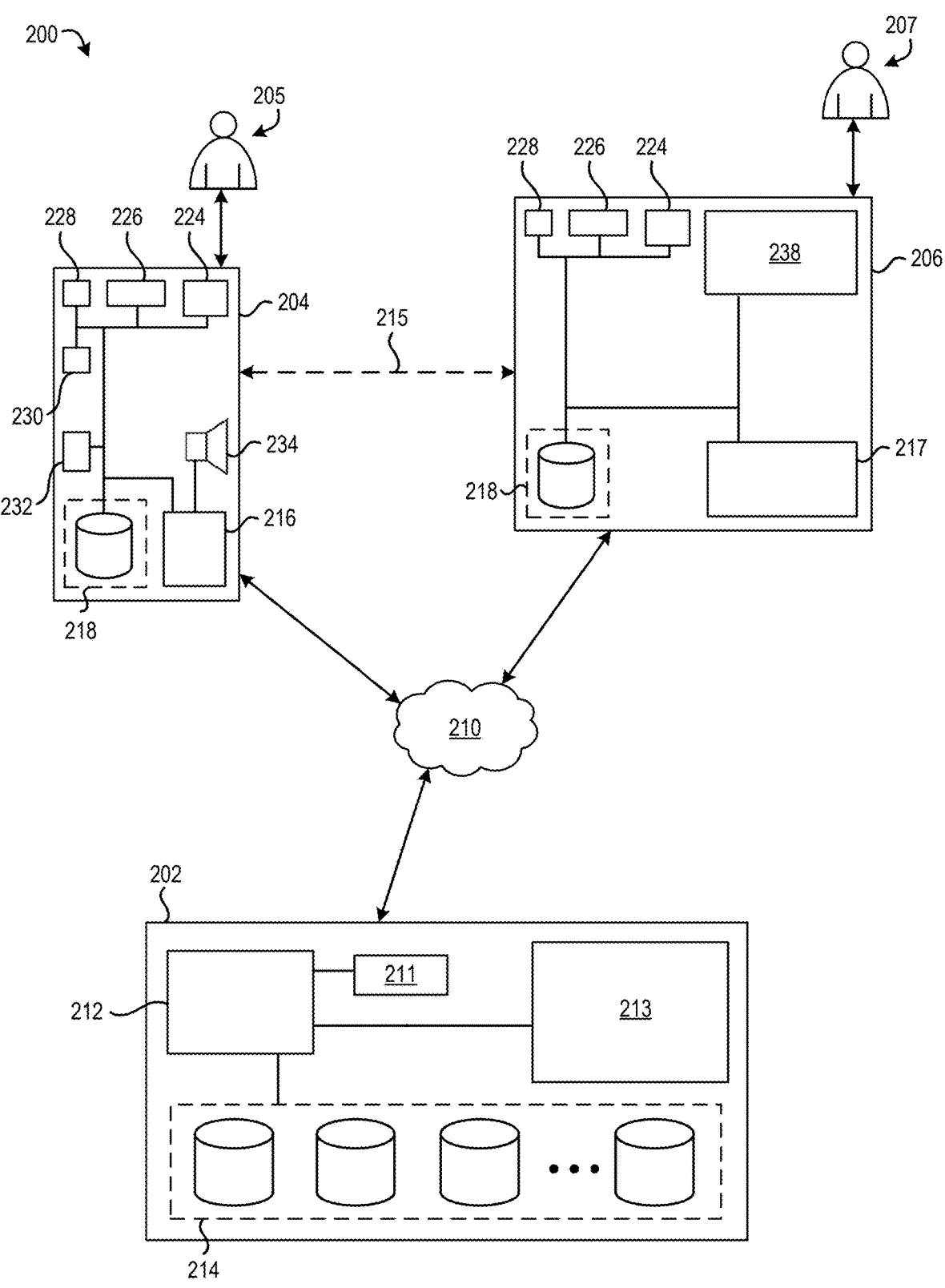
FIG. 2A is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for selecting source datasets to use while performing multitask model tuning on a model, the selected source datasets providing context during a "source training step" of the model which allows for relevant transfer learning to occur. The source trained model may further be applied to a new dataset (e.g., a dataset that includes textual entries) at an edge location during a "target training step" which creates a final model that has been trained in view of the context gleaned from the chosen source datasets during the source training step, e.g., as will be described in further detail below.

The following description thereby discloses several preferred approaches of improving the efficiency by which multitask model tuning (or "multitask fine-tuning") may be performed. It should be appreciated that various approaches herein can be implemented with a wide range of multitask model tuning types, including for example multitask prompt tuning, multitask prefix tuning, etc., or any other type of multitask model tuning that would be apparent to one skilled in the art after reading the present description. To provide a context, and solely to assist the reader, various approaches may be described with reference to a type of multitask model tuning. For instance, many approaches are described in the context of multitask prompt tuning (MPT). This has been done by way of example only, and should not be deemed limiting.

In one general approach, a CIM includes: receiving a user dataset having textual entries, and sampling a number of the textual entries in the received user dataset. The textual entries sampled from the user dataset are applied to an encoding model that corresponds to a given large language model architecture. The vectors that are produced by the encoding model are combined. The combined vectors are further sent to a vector database. In response, one or more public datasets are received from the vector database, the one or more public datasets being a closest match to the combined vectors.

It follows that various approaches herein are able to select source datasets to use while performing multitask model tuning on a model such that relevant (e.g., valuable) transfer learning occurs. As mentioned above, the selected source datasets provide context during a "source training step" of the model. Searching a repository of encoded datasets for entries that are a closest match to a new dataset (e.g., environment) thereby allows for relevant transfer learning to occur while initially training the underlying model. The knowledge that is transferred and learned or "injected" into an underlying model thereby shifts the starting point at which the model begins training. This significantly reduces the amount of additional training associated with developing an optimized (e.g., sufficiently accurate) model, e.g., as would be appreciated by one skilled in the art after reading the present description.

In some implementations, the vectors that are produced by the encoding model are combined by calculating a mean of the vectors. Moreover, the vectors may be combined at an edge node, while the vector database is stored at a cloud location. The edge node may thereby be connected to the cloud location over a network.

This allows for each of the vectors that are produced to be represented in the resulting (e.g., simplified) combination. Moreover, a large repository of public datasets may be maintained at the cloud location, providing a more robust collection of sample datasets. The public datasets returned as being a closest match to the combined vectors thereby incorporate a full spectrum of the information included in the original vectors produced by the encoding model. This in turn will improve the efficiency by which transfer learning occurs.

In some implementations, all public datasets in the vector database may be received at an edge node from the vector database, along with an indication of how similar each respective public dataset is to the combined vectors. Accordingly, any desired number of the available public datasets may be used to perform source training on a model, achieving a desired amount of transfer learning to occur. The indications of how similar each public dataset is to the combined vectors may also be used to select datasets having a desired level of similarity to a new dataset. Moreover, in some approaches, a level of similarity between a public dataset and a combined set of vectors may be represented by the cosine distance between the dataset and vectors.

In some implementations, the vector database may be formed by receiving the public datasets, and sampling a number of textual entries in each of the received public datasets. The textual entries sampled from each of the respective public datasets are further applied to encoding models that correspond to predetermined large language model architectures. Each of the encoding models is configured to break the sampled textual entries into tokens, and map each of the tokens into vectors. The vectors produced by the encoding models are thereby used to form the vector database.

This process ensures the privacy and security of the original data is maintained, even if sent to a shared location, e.g., such as a public cloud. The vectorized information may thereby be combined and sent from an edge node to a central node without exposing any details of the underlying textual entries (e.g., data) that was used to form the vectors. In turn, the central node may use the received vector information to search a vector database to determine one or more of the datasets that are a closest match to the combined vectors.

In some implementations, the received one or more public datasets are used to train a task shared prompt. Moreover, the trained task shared prompt along with the user dataset are used to train a task specific prompt. In some approaches, the task shared prompt and the task specific prompt are trained at an edge node, while the vector database is stored at a cloud location. Approaches herein are thereby able to perform prompt tuning.

Prompt tuning is intended to refer to the process of adapting a base pretrained model to each desired task via conditioning on learned prompt vectors. For instance, prompt tuning may be used to efficiently adapt large language models to multiple downstream tasks. Approaches herein may thereby initially learn a single transferable prompt by distilling knowledge from multiple task-specific source prompts.

Furthermore, multiplicative low rank updates to this shared prompt may be learned to efficiently adapt it to each downstream target task, e.g., as would be appreciated by one skilled in the art after reading the present description. As a result, approaches herein are able to exploit the rich cross-task knowledge with prompt vectors in a multitask learning setting, e.g., as will be described in further detail below.

In another general approach, a CPP includes: a set of one or more computer-readable storage media. The CPP also includes program instructions that are collectively stored in the set of one or more storage media. Moreover, the program instructions are for causing a processor set to perform any combination of the foregoing methodologies. It follows that CPPs are able to achieve the improvements described above by performing the combinations of the foregoing methodologies.

In another general approach, a CS includes: a processor set, and a set of one or more computer-readable storage media. The CS further includes program instructions that are collectively stored in the set of one or more storage media. The program instructions are for causing the processor set to perform any combination of the foregoing methodologies. It follows that CSs are able to achieve the improvements described above by performing the combinations of the foregoing methodologies.

In still another general approach, a CIM is for creating a vector database. The CIM includes: receiving public datasets which include textual entries. For each of the received public datasets, a number of the textual entries in the given public dataset are sampled. The sampled textual entries from the given public dataset are applied to encoding models that correspond to predetermined large language model architectures. Vectors that are produced by the encoding models are further used to create the vector database.

In some implementations, a search request having combined vectors from an edge node is received at a cloud location having a vector database. The vector database may thereby be used to determine one or more of the public datasets included therein that are a closest match to the combined vectors in the search request. Moreover, the one or more public datasets determined as being a closest match to the combined vectors in the search request may be returned to the edge node.

As noted above, the combined vectors received from the edge node do not expose any sensitive details that may be present in the raw data from which the vectors were formed. This ensures the privacy and security of the original data is maintained, even if sent to a shared location, e.g., such as a public cloud. In turn, the cloud location may thereby use the received vector information to search a vector database to determine one or more of the datasets that are a closest match to the combined vectors.

In another general approach, a CPP is for creating a vector database. The CPP includes: a set of one or more computer-readable storage media, and program instructions. The program instructions are collectively stored in the set of one or more storage media, and are for causing a processor set to perform any combination of the foregoing methodologies. It follows that CPPs are able to achieve the improvements described above by performing the combinations of the foregoing methodologies.

A particular application of an approach can be using the CIM(s) as described above to perform MPT on a model at an edge server such that it can more efficiently evaluate new data. Initially, a user dataset may be received (e.g., generated) at the edge server. The user dataset is applied to an encoding model, which produces an encoded vector user dataset. The encoded vector user dataset may be a mean vector representing the user dataset in some approaches. The encoded vector user dataset is further sent to a cloud server over a network. The cloud server uses the encoded vector to search a vector database to identify the "N" datasets in the vector database that are a closest match to the user dataset. In other words, the encoded vector user dataset is compared against various entries in the vector database, each of which is encoded according to a different large language model. The "N" entries identified as being a closest match to the encoded vector user dataset may thereby be identified and returned from the cloud location back to the edge location.

These closest "n" datasets may thereby be used to perform a source training step (e.g., portion) of the MPT process, thereby providing transferred learning that improves the efficiency at which an accurate model may be generated for the new user dataset, e.g., as will be described in further detail below.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved model training code at block 150 for selecting source datasets to use while performing MPT on a model, the selected source datasets providing context during a "source training step" of the model which allows for relevant transfer learning to occur. The source trained model may further be applied to a new dataset (e.g., a dataset that includes textual entries) at an edge location during a "target training step" which creates a final model that has been trained in view of the context gleaned from the chosen source datasets during the source training step.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a- service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, increased data production has amplified the overhead associated with performing data processing. While AI has been developed in an attempt to combat this rise in processing overhead, advancements in AI have caused the complexity of machine learning models to increase as well. Increasingly complex machine learning models translate to more intense workloads and increased strain associated with applying the models to received data. The operation of conventional implementations has thereby been negatively impacted.

Cloud computing has been implemented in an effort to improve the ability to perform computationally intense operations and process an increasing amount of data. For instance, cloud locations can be tailored to provide a dynamic level of computational throughput which adjusts to meet a client's needs. While this is effective in preventing processing bottlenecks from developing, it involves sending all data being analyzed to a centralized location, such as a data center or public cloud location. Sending data to a centralized location exposes it to unwanted attacks and unintentional mishandling, thereby significantly increasing the risk of data loss.

In an attempt to combat this reliance on a network to perform all processing at a central location, edge computing has been implemented to extend computing to the endpoints in a system. For instance, applications and other types of compute operations are moved to the edge locations where the data is generated in the interest of data privacy and security. For example, data may not be allowed to leave the borders of a particular country to enhance the security and privacy of the data. In another example, a company may prefer to store generated data at an edge location (e.g., "on prem") such that it is not shared over a network.

While this data management scheme increases data integrity by improving security and retention, it significantly limits the utility of the data. For instance, client locations are often unable to handle the intense processing and data storage constraints associated with developing or even maintaining a functional AI model that is capable of analyzing a large amount of data. Thus, clients are unable to use the data generated at an edge location to train any type of AI model without sharing their data, sacrificing the privacy and security of the data. Entities that handle sensitive information, e.g., such as personal data, financial data, intellectual property, etc. have thereby been precluded from developing AI models that are trained using actual use data.

It follows that conventional systems have been forced to choose between data security and processing capabilities, causing them to suffer from operational and performance based inefficiencies. In sharp contrast to the foregoing shortcomings experienced by conventional systems, approaches herein are desirably able to select source datasets to use while performing MPT on a model, the selected source datasets providing context during a "source training step" of the model which allows for relevant transfer learning to occur. The source trained model may further be applied to a new dataset (e.g., a dataset that includes customer data) at an edge location during a "target training step" which creates a final model that has been trained in view of the context gleaned from the chosen source datasets during the source training step. Moreover, by keeping the new dataset and related target training step at the edge location, security and privacy is enhanced overall by preventing any exposure of the new dataset.

In preferred approaches, a vector database is used to store encoded datasets vectors at a cloud location. For each dataset being stored, samples are selected (e.g., statistically selected) and encoded as vectors before being combined, e.g., into a mean of the vectors. Moreover, the combined vectors may be stored in the vector database. Similarly, a newly produced user dataset may be encoded as vectors and combined (e.g., into a mean of the vectors) at an edge location. The combination of vectors produced from the user dataset may further be compared against entries in the vector database at the cloud location without exposing the original user dataset. A similarity search may thereby be used to determine the datasets in the vector database that are most relevant to the user dataset. The determined datasets may further be transferred to the edge location and used to initialize MPT. This desirably improves model accuracy and learning speed while simultaneously maintaining privacy and security of the user dataset, e.g., as will be described in further detail below.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to a user device 204, and edge node 206 accessible to the user 205 and administrator 207, respectively. The central server 202, user device 204, and edge node 206 are each connected to a network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user device 204, edge node 206, and/or central server 202, regardless of the amount of separation which exists therebetween, e.g., despite being positioned at different geographical locations. According to some approaches, the central server 202 is a remote cloud server that is connected to (e.g., may be accessed by) user device 204 and/or edge node 206.

However, it should be noted that two or more of the user devices 204, edge node 206, and central server 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc., or any other type of connection which would be apparent to one skilled in the art after reading the present description.

The terms "user" and "administrator" are in no way intended to be limiting either. For instance, while users and administrators may be described as being individuals in various implementations herein, a user and/or an administrator may be an application, an organization, a preset process, etc. The use of "data," "datasets," and "information" herein are in no way intended to be limiting either, and may include any desired type of details, e.g., depending on the type of operating system implemented on the user device 204, edge node 206, and/or central server 202. In some approaches, datasets of textual entries (e.g., strings of alphanumeric characters) that are generated at the edge node 206 may be kept at the edge node 206 to ensure data security and retention. For example, datasets having sensitive information (e.g., personal data, financial data, intellectual property, etc.) may intentionally be retained at an edge server where the datasets were formed. However, other information deemed as not being sensitive may be sent to the central server 202 from user device 204 and/or edge node 206 for processing using one or more machine learning models.

With continued reference to FIG. 2A, the central server 202 includes a large (e.g., robust) processor 212 coupled to a cache 211, an AI module 213, and a data storage array 214 having a relatively high storage capacity. The AI module 213 may include any desired number and/or type of AI-based models, e.g., such as machine learning models, deep learning models, neural networks, etc. In preferred approaches, the AI module 213 and/or processor 212 is able to implement aspects of prompt tuning, more specifically MPT. With respect to the present description, "prompt tuning" refers to the process of adapting a base pretrained model to each desired task via conditioning on learned prompt vectors. For instance, prompt tuning may be used to efficiently adapt large language models to multiple downstream tasks. It should also be noted that "MPT" refers to a process, which initially includes learning a single transferable prompt by distilling knowledge from multiple task-specific source prompts. Furthermore, multiplicative low rank updates to this shared prompt are learned to efficiently adapt it to each downstream target task, e.g., as would be appreciated by one skilled in the art after reading the present description. As a result, approaches herein are able to exploit the rich cross-task knowledge with prompt vectors in a multitask learning setting, e.g., as will be described in further detail below (e.g., see method 300 of FIG. 3A).

According to some approaches, the AI module 213 and/or data storage array 214 includes a vector database that includes a number of datasets that have each been applied to a number of encoding models. Each encoding model may correspond to a different large language model that is supported by the system. In other words, each encoding model may apply a different language space that interprets a given dataset in a way that is unique to the respective large language model. The large language models that are supported by the system may include, but are in no way limited to, the T5 transformer model, the Bidirectional Encoder Representations from Transformers (BERT) language model, the ELECTRA language model, etc., or any other large language models (e.g., language spaces) that would be apparent to one skilled in the art after reading the present description.

Each entry in the vector database may be compared against vector information received from other locations. For example, a mean vector received from the edge node 206 may be compared against the entries in the vector database and identify the "N" entries that are a closest match to the received mean vector. In some approaches, entries in the vector database may be organized such that the distance between entries is inversely proportional to how similar the entries are. A received mean vector may thereby be plotted in the vector database and the "N" closest entries may be selected as the datasets that are a closest match to the dataset that produced the mean vector, e.g., as will be described in further detail below.

With continued reference to FIG. 2A, user device 204 includes a processor 216 which is coupled to memory 218. The processor 216 receives inputs from and interfaces with user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Some data (e.g., non-sensitive data) may be received from user 205 for storage and/or evaluation using AI module 213 at central server 202. The data may be received as a result of the user 205 using one or more applications, software programs, temporary communication connections, etc. running on the user device 204. For example, the user 205 may upload data for storage at the data storage array 214 and evaluation using processor 212 and/or AI module 213 of central server 202. As a result, the data is evaluated and processed.

Looking now to the edge node 206, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to an AI module 238.

As described above with respect to AI module 213, the AI module 238 may include any desired number and/or type of AI-based models. It follows that AI module 238 may implement similar, the same, or different characteristics as AI module 213 in central server 202. In some approaches, AI module 238 is configured to perform MPT and form a model using specific (e.g., chosen) source datasets which provide context during a "source training step" of the model. Selecting the source datasets that provide context allows for relevant transfer learning to occur as the model is being source trained.

Figure 2B:
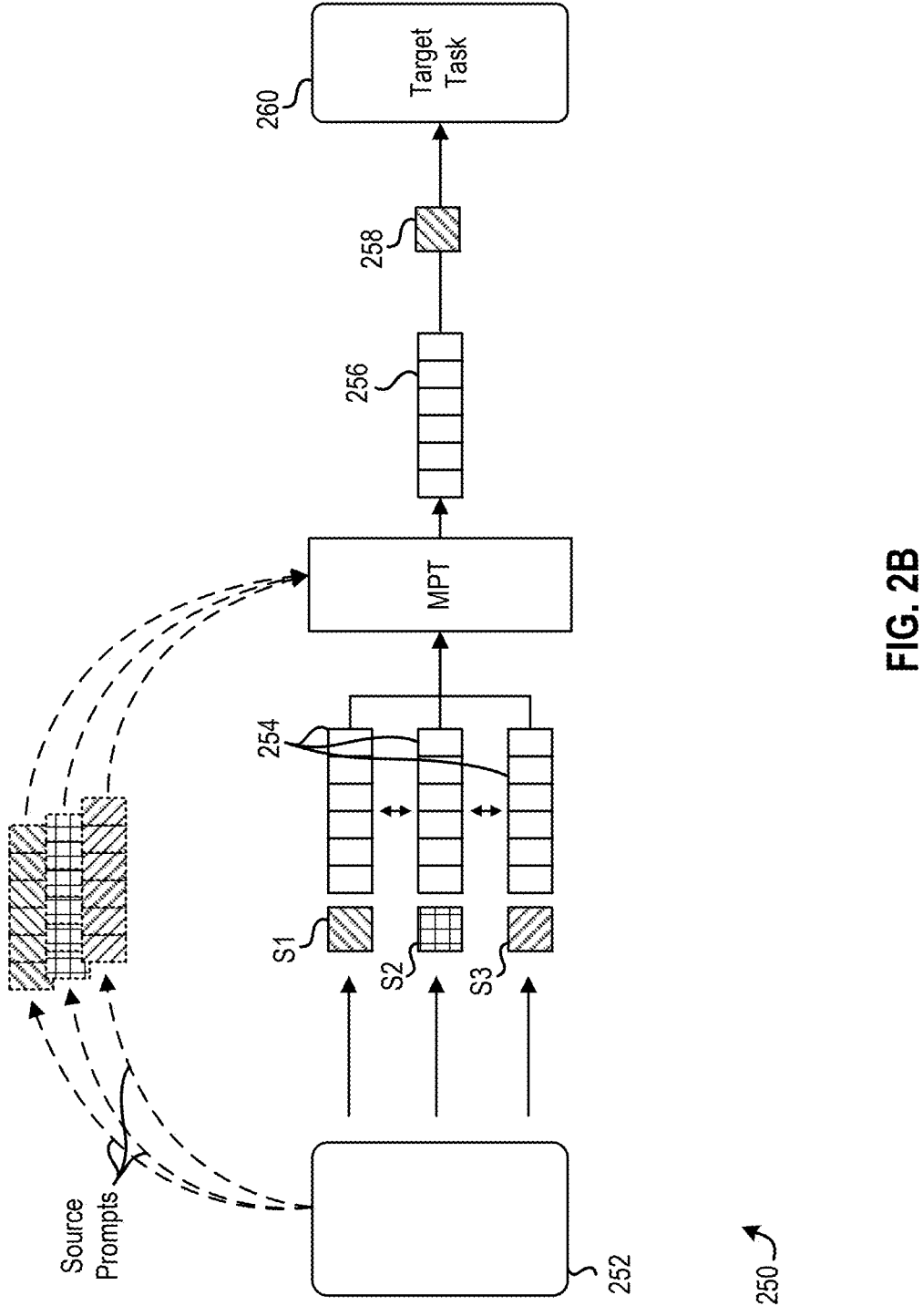
FIG. 2B is a representational diagram of performing multitask prompt tuning, in accordance with one approach.

Referring momentarily to FIG. 2B, a representational diagram 250 of performing MPT by learning a shared prompt that tunes a model which can be used for multiple tasks is illustrated in accordance with one approach which is in no way intended to be limiting. The process of learning a shared prompt space is particularly challenging as it involves learning commonalities across different source tasks while minimizing interference. Therefore, the soft prompt of each source task (which can be represented as a prompt matrix) may be decomposed into a multiplication of a shared matrix and a low-rank task-specific matrix. The inventors have discovered that this decomposition is more effective than simply sharing the prompt matrix across all tasks. Moreover, the decomposition is learned through knowledge distillation from soft prompts that are obtained from regular prompt tuning. To transfer it to new tasks, we perform low-rank multiplicative updates to the shared prompt matrix, e.g., as will soon become apparent.

As shown in the representational diagram 250, a repository 252 (e.g., vector database) of source prompts may be selected from, and the selected source prompts may be used during a source training phase. Customer is thereby able to select datasets to be used in the source training phase, during which per-task parameters are learned, while also sharing knowledge in a common set of parameters that may be referred to as a shared prompt.

It follows that a set of task-specific datasets S1, S2, S3 are selected from the repository 252 and used to perform source training. As a result, a task-shared prompt 254 is produced and used as an initial framework in conducting MPT. This effectively provides the selected datasets S1, S2, S3 as source prompts for MPT as shown by the dashed lines. The resulting transferred prompt 256 may thereby be further trained using a new user dataset 258 to produce a resulting target task 260.

Accordingly, source training phase has a large impact on the model accuracy and convergence speed. This phase sets the starting point in the final training, which can be close to the optimal point (parameters) in case of good dataset selection and can be a damaging factor in situations where dissimilar datasets are selected to conduct the source training. The starting point in training can dramatically impact final model accuracy, and training speed by learning one shared prompt for multiple tasks. This also allows for one supporting model to be deployed, rather than deploying a different model for each individual task. Furthermore, approaches herein are able to achieve transferred learning by leveraging knowledge gleaned from relevant data, which boosts training and performance for target task(s). This may be particularly useful in situations involving multi-task learning, e.g., such as foundation models. Foundation models often pivot quickly, e.g., from answering customer questions to identifying negative comments in online reviews. Rather than design a unique prompt for each task, approaches herein may be used to create universal prompts that can be easily recycled.

Returning now to FIG. 2A, the AI module 238 may further be configured to apply a source trained model to a new dataset generated at the edge node 206. For example, the source trained model may be applied to a dataset generated as a result of interactions with administrator 207 and/or user 205 over a direct communication link 215 with the user device 204. The new dataset may thereby include textual entries of customer data that preferably remains at the edge node 206 and which is intentionally not uploaded to the central server 202 over network 210. The new dataset may be kept at the edge node 206 while performing a "target training step" of finalizing the already source trained model. The final version of the model may thereby have been trained in view of the context gleaned from the chosen source datasets during the source training step. Moreover, by keeping the new dataset and related target training step at the edge node 206, security and privacy is enhanced overall by preventing any exposure of the contents of the new dataset.

However, edge node 206 is also preferably configured to encode the new dataset, e.g., by applying the new dataset to an encoding model. The encoding model breaks any textual inputs in the new dataset into tokens and maps the tokens into vectors. This process ensures the privacy and security of the original data is maintained, even if sent to a shared location, e.g., such as a public cloud. The vectorized information may thereby be combined and sent from the edge node 206, to the central node 202 without exposing any details of the underlying textual entries (e.g., data) that was used to form the vectors.

In turn, the central node 202 may use the received vector information to search the vector database to determine one or more of the datasets that are a closest match to the combined vectors. In other words, the central node 202 may use the received vector information to identify the closest "N" datasets. These closest "N" datasets may thereby be returned from central node 202 to edge node 206 and provide relevant context while source training the model, e.g., as described above. The number "N" of datasets may be set (e.g., predetermined) by a user, dynamically adjusted based on real-time performance, adjusted using the output of one or more trained machine learning models, updated in response to receiving one or more instructions from a user, etc.

Figure 3A:
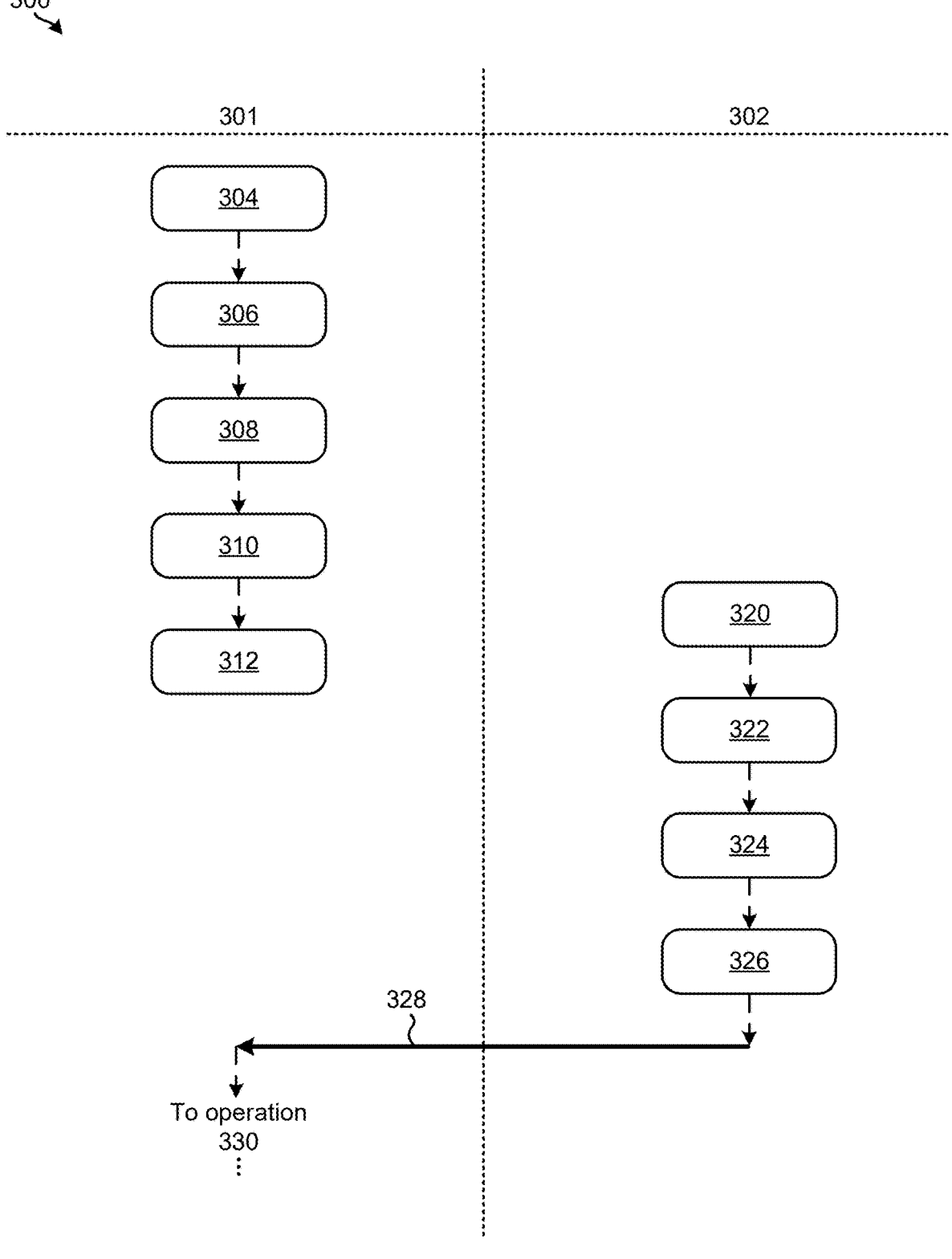
FIG. 3A is a flowchart of a method, in accordance with one approach.

Looking now to FIG. 3A, a method 300 for performing MPT on a model is illustrated in accordance with one approach. One or more of the operations in method 300 select source datasets to use while performing MPT on a model, the selected source datasets providing context during the source training step of the model which allows for relevant transfer learning to occur. Method 300 also includes applying the source trained model to a new dataset at an edge location during a target training step which creates a final model that has been trained in view of the context gleaned from the chosen source datasets during the source training step. Accordingly, the operations of method 300 may be performed continually in the background of an operating system without requesting input from a user (e.g., human).

Figure 3A:
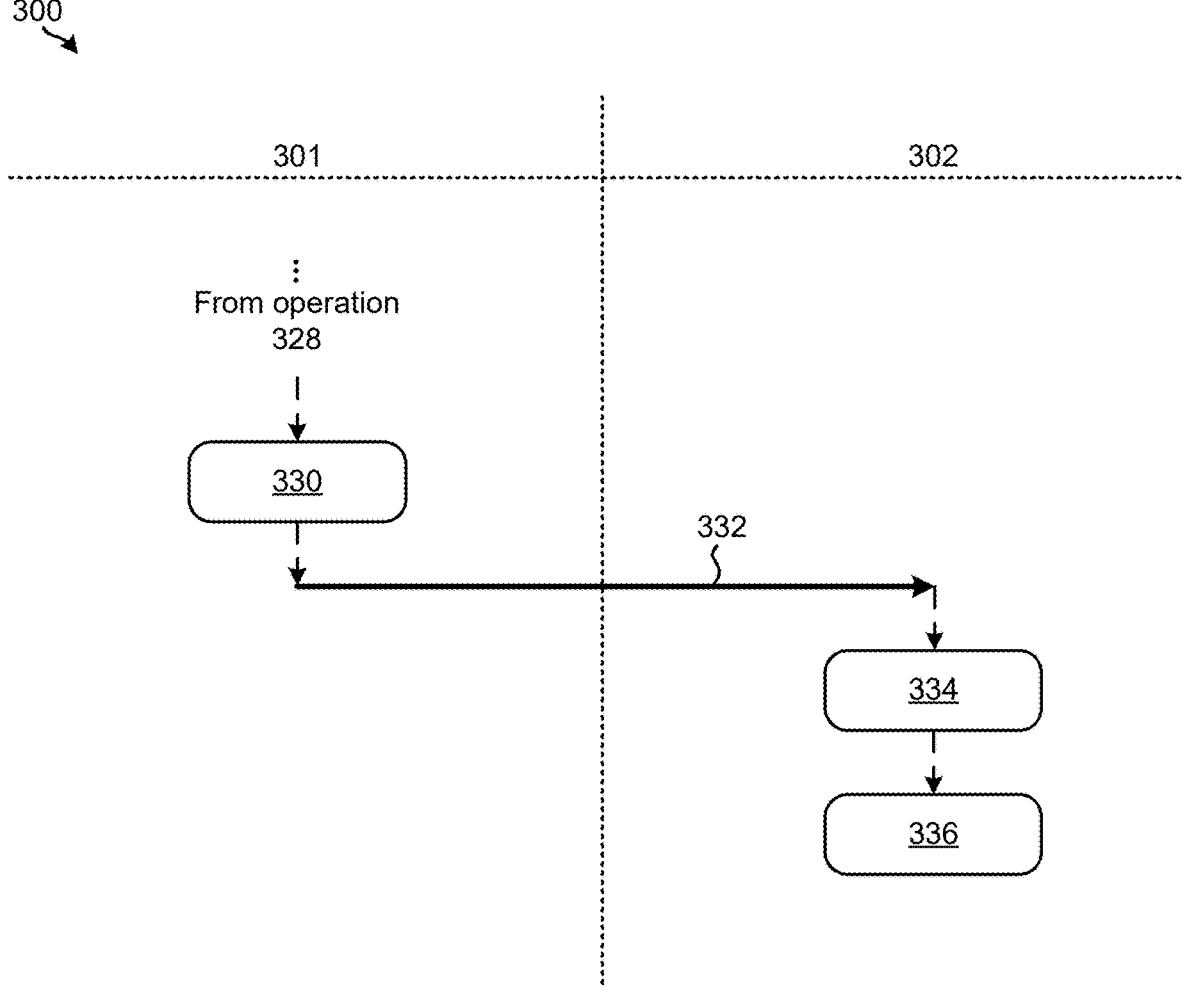

While certain information (e.g., warnings, reports, read requests, etc.) may be issued to a user, it is again noted that the various operations of method 300 can be repeated in an iterative fashion for new datasets that are generated at an edge node connected to a central data storage location. Thus, method 300 may be performed in accordance with the present invention in any of the environments depicted in FIGS. 1-2, among others, in various approaches. Of course, more or less operations than those specifically described in FIG. 3 may be included in method 300, as would be understood by one of skill in the art upon reading the present descriptions.

Each of the steps of the method 300 may be performed by any suitable component of the operating environment. For example, both of the nodes 301, 302 shown in the flowchart of method 300 may correspond to one or more processors positioned at a different location in a distributed data production and storage system. Moreover, each of the one or more processors are preferably configured to communicate with each other. In another example, at least one of the nodes 301, 302 may include an encoding model configured to convert textual entries (e.g., strings of alphanumeric characters) in datasets to vectorized information. In some approaches, the vectorized information is added to a vector database and compared against new datasets, e.g., as will be described in further detail below. In other approaches, the vectorized information is sent to a cloud location and used to return datasets that are similar to a source of the vectorized information.

In various implementations, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes nodes 301, 302, both of which represent one or more processors, controllers, computers, etc., positioned at a different location in a distributed data storage system. For instance, node 301 may include one or more processors located at a central data storage location (e.g., cloud server) of a distributed compute system (e.g., see central server 202 of FIG. 2A above). Node 302 may include one or more processors located at an edge node (e.g., edge server) of a distributed compute system (e.g., see edge node 206 of FIG. 2A above). Accordingly, commands, data, requests, etc. may be sent between the nodes 301, 302 depending on the approach.

It should also be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches. Additionally, the number of nodes included in FIG. 3A is in no way intended to be limiting. For instance, additional edge nodes may be included in some approaches. Accordingly, any desired number of edge nodes may be connected to the central server, e.g., as would be appreciated by one skilled in the art after reading the present description.

As shown in the flowchart, method 300 includes operation 304 which is performed at node 301. There, operation 304 includes installing a vector database. In other words, operation 304 includes initializing (e.g., establishing) a logical space that may be used to form and maintain a vector database. The vector database may be used to store representations of various public datasets, e.g., as will be described in further detail below.

Furthermore, operation 306 includes receiving public datasets which include textual entries. The public datasets may be received from a number of different sources depending on the approach. In some approaches, the data may be actively scraped from publicly available websites and received as strings of textual entries that are combined into collections to form the datasets. In other approaches, data having textual entries may be collected from one or more repositories of test data and combined into datasets of textual entries. In other approaches, textual entries may be proactively combined into datasets (e.g., by a remote system) and received at node 301 over a network (e.g., see network 210 in FIG. 2A). The type of textual entries that are included in the datasets received in operation 306 may also differ depending on the approach. For instance, the textual entries in a received dataset may be multi-column text entries, single-column text entries, etc.

The received datasets are preferably processed and maintained in a database. The various processed datasets in the database may thereby serve as a repository that a newly received dataset may be compared against to identify existing datasets that are a closest match, e.g., as will soon become apparent. Accordingly, operation 308 includes sampling a configurable number of the textual entries in each of the respective public datasets that are received. In other words, the number of textual entries that are sampled in operation 308 may be set based on the type of public dataset being evaluated, predetermined by a user, dynamically adjusted based on performance, etc. In some approaches, the number of textual entries that are sampled from a given dataset may be set based on an output from one or more statistical sampling algorithms. In other approaches, the number of samples and/or the textual entries that are actually sampled may be chosen at random.

It follows that operation 308 may serve as a preprocessing step that prepares each of the public datasets to be added to the database. Additionally, operation 310 includes applying the sampled textual entries to one or more encoding models. In other words, each of the textual entries sampled from the public dataset in operation 308 are applied to encoding models. Embedding layers in the encoding models break the input textual entries into tokens and map each of the tokens into vectors (e.g., vectorized information).

Each of the encoding models is correlated with a different large language model that is supported by the system. Each encoding model may thereby apply a different language space that interprets the textual entries of a dataset in a way that is unique to the respective large language model. The resulting vector information and corresponding dataset are thereby compatible with the large language model implemented in the encoding model used to encode the samples. Each of the sampled textual entries are thereby preferably applied to a different encoding model for each supported large language model architecture. The number and/or type of large language model architectures that are supported in a given approach may be predetermined by a user, be based on applications that are currently running, types of textual entries (e.g., different languages) in the public dataset, etc.

From operation 310, method 300 advances to operation 312. There, operation 312 includes using the vectors produced by the encoding models to populate the vector database installed in operation 304. In other words, operation 312 includes using the vectorized information produced by the encoding models as a result of performing operation 310 to create and maintain the vector database. As a result, the vector database is populated with representations (e.g., encodings) of multiple datasets over time, each of which represents a different task. Moreover, each of the datasets in the database are encoded as vectors per a different supported large language model architecture.

Operations 304, 306, 308, 310, 312 may be repeated over time as public datasets are received in order to expand the representations included in the vector database. It follows that in some approaches, these operations may be performed in the background so as to not impact system performance. The performance of operations 304, 306, 308, 310, 312 may even be interrupted in some instances, e.g., in response to receiving a search request from an edge node. The representations of datasets accumulated in the vector database may thereby be compared against representations of newly received datasets to identify any similarities therebetween, e.g., as will soon become apparent.

With continued reference to FIG. 3A, operation 320 occurs at node 302 (e.g., an edge node). There, operation 320 includes receiving a user dataset having textual entries. In some approaches, the user dataset is generated at node 302. In other approaches, the user dataset is received from a local component (e.g., a user device) sharing a secure connection with node 302. The textual entries (e.g., strings of alphanumeric characters) that are generated at node 302 may intentionally be kept at node 302 to ensure data security and retention, in some approaches. For example, datasets having sensitive information (e.g., personal data, financial data, intellectual property, etc.) may intentionally be retained at an edge server where the datasets were formed. However, in some approaches, other information deemed as not being sensitive may be sent to a central server (e.g., at node 301) for processing using one or more machine learning models and/or encoding models.

Proceeding to operation 322, a configurable number of the textual entries in the received user dataset are sampled. In other words, the number of textual entries that are sampled from the new user dataset in operation 322 may be set based on the type of user dataset being evaluated, predetermined by a user, dynamically adjusted based on performance, etc. In some approaches, the number of textual entries that are sampled from a user dataset may be set based on an output from one or more statistical sampling algorithms. In other approaches, the number of samples and/or the textual entries that are actually sampled may be chosen at random.

From operation 322, the flowchart proceeds to operation 324. There, operation 324 includes applying the textual entries sampled from the user dataset, to one or more encoding models. In other words, each of the textual entries sampled from the user dataset in operation 322 are applied to encoding models in operation 324. As noted above, each of the encoding models corresponds to a different large language model (e.g., language space). Accordingly, the embedding layer in each of the encoding models breaks the input textual entries into tokens and maps each of the tokens into vectors (e.g., vectorized information) according to the respective large language model.

Again, each of the encoding models is correlated with a different large language model supported by the system. Each encoding model may thereby apply a different language space that interprets the textual entries of the user dataset in a way that is unique to the respective large language model. The resulting vector information and corresponding dataset are thereby compatible with the large language model implemented in the encoding model used to encode the samples. Each of the sampled textual entries are thereby preferably applied to a different encoding model for each supported large language model architecture. The number and/or type of large language model architectures that are supported in a given approach may be predetermined by a user, be based on applications that are currently running, types of textual entries (e.g., different languages) in the public dataset, etc.

From operation 324, method 300 advances to operation 326. There, operation 326 includes combining vectors produced by the encoding model. According to some approaches, combining the vectors includes calculating a mean of the vectors. The mean of the vectors may be calculated by combining the mean value of each variable used to represent the vectors produced by the encoding model, e.g., as would be appreciated by one skilled in the art after reading the present description. In other approaches, the vectors produced by the encoding models may be combined in other ways. For example, a weighted value may be applied to each of the vectors.

It should also be noted that the vectors are preferably combined at the location they were formed. Accordingly, operation 326 is shown in FIG. 3A as being performed at node 302 where the user dataset was actually vectorized (e.g., converted into vectorized information). As previously mentioned, this desirably maintains data security and retention by not exposing potentially sensitive information in the user dataset in a public location (e.g., a public cloud server). Although the user dataset itself is preferably kept at the edge node, the process of forming and combining the vectors effectively shields any sensitive information from being exposed. In other words, encoding and vectorizing the textual entries sampled from the user dataset received in operation 320 prevents the textual entries themselves (or any related information) from being shared outside node 302. This is true even if the combined vectors are actually sent from node 302. Accordingly, the combined vectors may be sent to node 301 and compared against datasets that are listed in the vector database. Datasets identified as being a closest match to the combined vectors received from node 302 may thereby be identified and returned to node 302 to perform MPT, e.g., as will be described in further detail below.

From operation 326, method 300 advances to operation 328 where a search request is sent from node 302 to node 301. The search request preferably includes the combined vectors formed in operation 326. Additional details may also be included in the search request, e.g., such as a desired number of similar datasets, information outlining what constitutes a dataset that is "similar" to the user dataset, time constraints, etc.

In response to receiving the search request having the combined vectors at node 301 from node 302, method 300 advances to operation 330. There, operation 330 includes using the vector database at node 301 to determine public datasets that are a closest match to the combined vectors received. In other words, operation 330 includes comparing the combined vector information received from node 302 in operation 328, to the information stored in the vector database. The combined vector information is preferably compared against entries in the vector database that were formed using an encoding model that corresponds to the same large language model. In other words, the combined vector information is preferably compared against entries in the vector database that have been formed by interpreting textual entries in public datasets using a same language space that was used to interpret the textual entries in the user dataset that formed the combined vector information. This ensures that the datasets which are selected from the vector database at node 301 provide context while performing MPT on a model. The chosen datasets are thereby able to achieve relevant transfer learning to occur back at an edge location without exposing any sensitive information outside the edge location.

According to some approaches, operation 330 includes using the vector information received from node 301 to search the vector database at node 302 and identify the closest "N" datasets. Depending on the approach, the number "N" of datasets may be 1, 2, 3, 4, 5, 6, 7, 8, 9, 10, 11, 15, 20, 25, 30, 40, 50, 60, 70, 80, 90, 100, 200, 300, etc. The number "N" of datasets may be set (e.g., predetermined) by a user, dynamically adjusted based on real-time performance, adjusted using the output of one or more trained machine learning models, updated in response to receiving one or more instructions from a user, etc. With respect to the present description, the "closest" datasets or more generally the "closeness" between datasets is intended to refer to a way of measuring (e.g., quantifying) how similar two datasets are to each other.

Different factors may be taken into consideration while determining how close two or more datasets are. Factors including, but not limited to, type(s) of information in the datasets, size of the datasets, production date/time of the datasets, configuration and/or organization details associated with the datasets, etc., may be taken into account while determining how similar two or more datasets are. In some approaches, the "N" datasets having the "N" lowest cosine distances in the vector database to the combined vectors are identified as being the closest (or most similar) datasets to the combined vectors. It follows that the entries in the vector database may be organized (e.g., represented) such that cosine distances between vectorized entries may be determined using known processes. Again, the "N" closest datasets were also preferably applied to a same embedding layer that produced the combined vectors used as a reference to search the vector database. It follows that these closest "N" datasets may provide the most relevant context while performing MPT. More specifically, the "N" closest datasets in the vector database may provide valuable insight while training a model.

It follows that the datasets identified in the vector database as being a closest match to the combined vector information received are preferably returned from node 302 back to node 301. Operation 332 thereby includes returning the "N" closest datasets identified in the vector database at node 301, to node 302.

While the number of similar datasets returned to node 302 has an impact on the amount of relevant transfer learning that is achieved, in some approaches, the benefits of the transfer learning may be weighed against the strain placed on the system and/or network by the number of datasets that are returned. In some approaches, all public datasets in the vector database may be returned to node 302, along with an indication of how close (e.g., similar) each respective public dataset is to the combined vectors generated from the new user dataset. This may maximize the amount of transfer learning that is achieved, e.g., as would be appreciated by one skilled in the art after reading the present description.

With continued reference to FIG. 3A, method 300 proceeds to operation 334 at node 302 in response to receiving the "N" closest public datasets from the vector database at node 301. There, operation 334 includes using the public datasets received from the vector database at node 301 to train a task shared prompt at node 301. In other words, operation 334 includes performing the source training step of a MPT procedure.

Performing source training on a model achieves a shared prompt that utilizes knowledge gained from the "N" closest public datasets that were received from the vector database. The source training essentially includes training a task (or dataset) specific prompt and a task-shared prompt. In some approaches, the task specific prompt includes a set of trainable weights. Moreover, for each dataset sample, back-propagation and weight updates are performed on the multiplication of the task specific prompt and the shared prompt. This allows the model to learn useful information for each task as well as across tasks, with more emphasis being placed on learning across tasks in some approaches.

From operation 334, method 300 advances to operation 336. There, operation 336 includes using the trained task shared prompt and the user dataset to train a task specific prompt at node 301. In other words, operation 336 includes performing the target training step of a MPT procedure in view of the transferred learning captured in operation 334. Again, training is initialized in operation 334 by applying the user dataset with parameters that capture knowledge across relevant tasks. This training is capitalized on in operation 336 while evaluating the user dataset by defining a more favorable starting point for training.

Figure 3B:
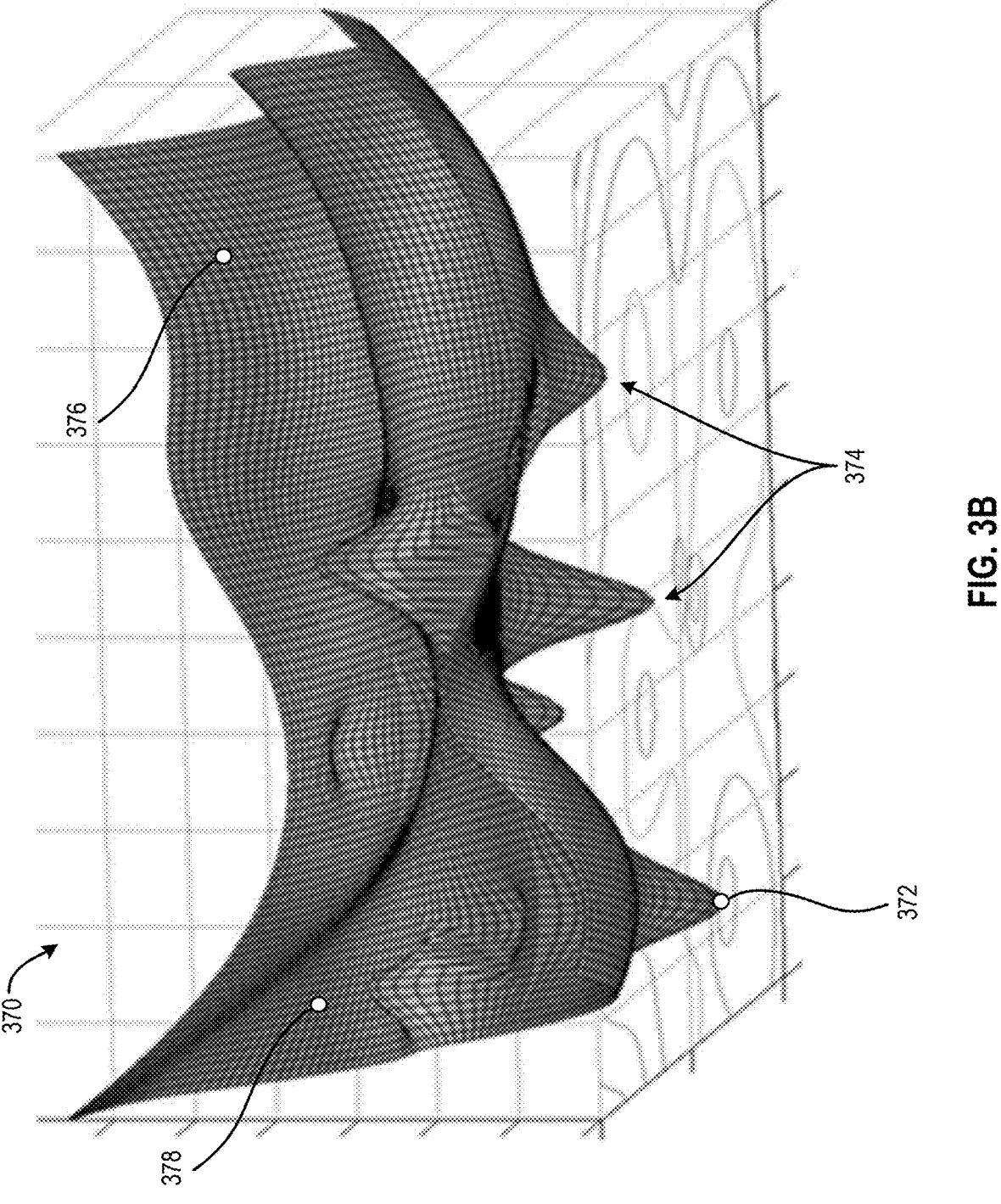
FIG. 3B is a graph illustrating the training space of a model, in accordance with one approach.

It follows that operations in method 300 are desirably able to fully utilize the benefits of MPT while also ensuring data privacy and security by training at the data source (e.g., at an edge node). Approaches herein are thereby able to simplify the model training process by significantly reducing the training space. Referring momentarily to FIG. 3B, graph 370 illustrates the improvements to training efficiency that are achieved as a result of performing operations of method 300. There, graph 370 displays a three-dimensional surface which represents the training space associated with creating a model that represents an environment (e.g., dataset). The lowest point 372 along the three-dimensional surface represents the optimal model configuration, while other localized low points 374 along the surface represent sub-optimal model configurations. Prior to performing the operations of method 300 and improving MPT by achieving transferred learning, a model may fall on the training space at a relatively high starting point 376. Starting point 376 is one of the farthest points along the training space from the lowest point 372, causing a significant number of resources to be consumed in order to improve the accuracy of the model and approach the lowest point 372.

However, by maintaining a repository of encoded datasets that can be searched for entries that are a closest match to a new dataset (e.g., environment), relevant transfer learning is achieved. The knowledge that is transferred and learned or "injected" into an existing model thereby shifts the starting point at which the model begins training. As shown, the improved starting point 378 is much closer to the lowest point 372, thereby significantly reducing the amount of additional training associated with developing an optimized (e.g., sufficiently accurate) model, e.g., as would be appreciated by one skilled in the art after reading the present description.

Figure 4:
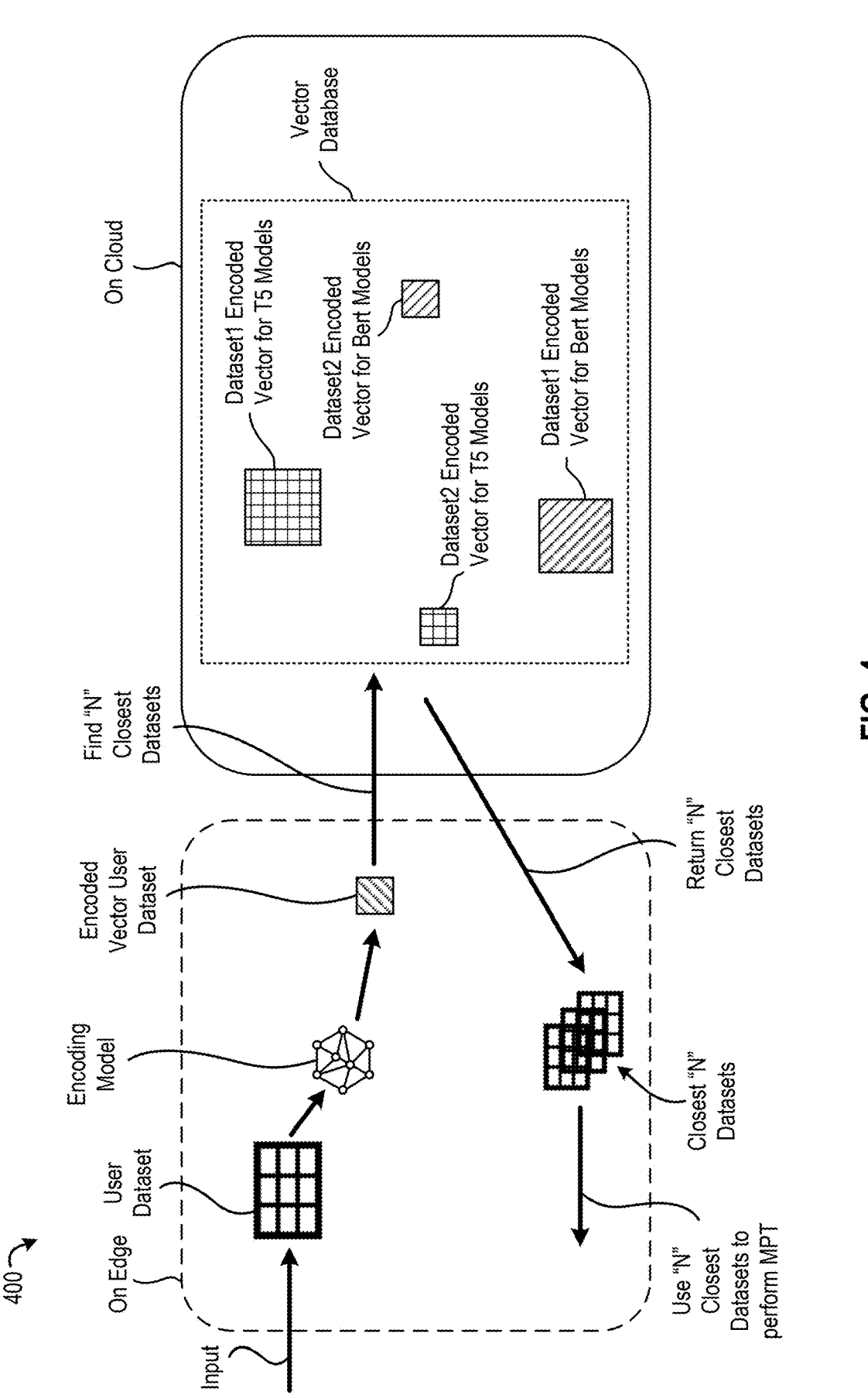
FIG. 4 is a representational diagram of performing a method in a distributed system, in accordance with one approach.

Referring now to FIG. 4, a distributed system 400 is illustrated in accordance with an in-use example, which is in no way intended to be limiting. As shown, a User Dataset is received (e.g., generated) at an edge server On Edge. The User Dataset is applied to an Encoding Model, which produces an Encoded Vector User Dataset. The Encoded Vector User Dataset is sent to a cloud server On Cloud (e.g., over a network), and is used to find the "N" closest datasets in the Vector Database. In other words, the Encoded Vector User Dataset is compared against various entries in the Vector Database, each of which is encoded according to a different large language model as shown. The "N" entries identified as being a closest match to the Encoded Vector User Dataset may thereby be identified and sent On Edge as shown. These Closest "N" Datasets may thereby be used to perform a source training step (e.g., portion) of the MPT process, thereby providing transferred learning that improves the efficiency at which an accurate model may be generated for the new User Dataset, e.g., as described herein.

Approaches herein are thereby able to implement MPT in addition to selecting datasets for source training. The source training may even be performed at an edge location without compromising data integrity. Training time is also reduced as a result of implementing approaches herein while using MPT for fine-tuning. As a result, user-experience is improved, and compute expenses are reduced. Additionally, adaptation and inference accuracy on user downstream tasks is improved, particularly compared to conventional products.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:
receiving a user dataset having textual entries;
sampling a number of the textual entries in the received user dataset;
applying the sampled textual entries from the user dataset to an encoding model that corresponds to a given large language model architecture;
combining vectors produced by the encoding model;
sending the combined vectors to a vector database; and
receiving, from the vector database, one or more public datasets that are a closest match to the combined vectors.

2. The CIM of claim 1, wherein the combining of the vectors produced by the encoding model includes calculating a mean of the vectors.

3. The CIM of claim 1, wherein the combining of the vectors is performed at an edge node, wherein the vector database is stored at a cloud location, wherein the edge node is connected to the cloud location over a network.

4. The CIM of claim 1, wherein the receiving of the one or more public datasets that are a closest match to the combined vectors includes:

receiving all public datasets in the vector database, along with an indication of how similar each respective public dataset is to the combined vectors.

5. The CIM of claim 1, wherein the vector database is formed by:
receiving the public datasets, wherein each of the public datasets includes textual entries;
for each of the received public datasets:
sampling a number of the textual entries in a given one of the received public datasets, and
applying the sampled textual entries from the given public dataset to encoding models that correspond to predetermined large language model architectures; and
using vectors produced by the encoding models to form the vector database.

6. The CIM of claim 5, wherein each of the encoding models is configured to:
break the sampled textual entries into tokens; and
map each of the tokens into vectors.

7. The CIM of claim 1, wherein the received one or more public datasets that are a closest match to the combined vectors includes a predetermined number of the public datasets having a lowest cosine distance to the combined vectors.

8. The CIM of claim 1, further comprising:
using the received one or more public datasets to train a task shared prompt; and
using the trained task shared prompt and the user dataset to train a task specific prompt.

9. The CIM of claim 8, wherein the task shared prompt and the task specific prompt are trained at an edge node, wherein the vector database is stored at a cloud location.

10. A computer program product (CPP), comprising:
a set of one or more computer-readable storage media; and
program instructions, collectively stored in the set of one or more storage media, for causing a processor set to perform the following computer operations:
receive a user dataset having textual entries;
sample a number of the textual entries in the received user dataset;
apply the sampled textual entries from the user dataset to an encoding model that corresponds to a given large language model architecture;
combine vectors produced by the encoding model;
send the combined vectors to a vector database; and
receive, from the vector database, one or more public datasets that are a closest match to the combined vectors.

11. The CPP of claim 10, wherein the combining of the vectors is performed at an edge node, wherein the vector database is stored at a cloud location, wherein the edge node is connected to the cloud location over a network.

12. The CPP of claim 10, wherein the vector database is formed by:
receiving the public datasets, wherein each of the public datasets includes textual entries;
for each of the received public datasets:
sampling a number of the textual entries in a given one of the received public datasets, and
applying the sampled textual entries from the given public dataset to encoding models that correspond to predetermined large language model architectures; and
using vectors produced by the encoding models to form the vector database.

13. The CPP of claim 12, wherein each of the encoding models is configured to:

break the sampled textual entries into tokens; and map each of the tokens into vectors.

14. The CPP of claim 10, wherein the received one or more public datasets that are a closest match to the combined vectors includes a predetermined number of the public datasets having a lowest cosine distance to the combined vectors.

15. The CPP of claim 10, wherein the program instructions are for causing the processor set to further perform the following computer operations:

use the received one or more public datasets to train a task shared prompt; and use the trained task shared prompt and the user dataset to train a task specific prompt.

16. The CPP of claim 15, wherein the task shared prompt and the task specific prompt are trained at an edge node, wherein the vector database is stored at a cloud location.

17. A computer system (CS), comprising:

a processor set;

a set of one or more computer-readable storage media;

program instructions, collectively stored in the set of one or more storage media, for causing the processor set to perform the following computer operations:

receive a user dataset having textual entries;

sample a number of the textual entries in the received user dataset;

apply the sampled textual entries from the user dataset to an encoding model that corresponds to a given large language model architecture;

combine vectors produced by the encoding model;

send the combined vectors to a vector database; and receive, from the vector database, one or more public datasets that are a closest match to the combined vectors.

18. The CS of claim 17, wherein the combining of the vectors is performed at an edge node, wherein the vector database is stored at a cloud location, wherein the edge node is connected to the cloud location over a network.

19. The CS of claim 17, wherein the vector database is formed by:

receiving the public datasets, wherein each of the public datasets includes textual entries;

for each of the received public datasets:

sampling a number of the textual entries in a given one of the received public datasets, and applying the sampled textual entries from the given public dataset to encoding models that correspond to predetermined large language model architectures; and using vectors produced by the encoding models to form the vector database.

20. The CS of claim 17, wherein the program instructions are for causing the processor set to further perform the following computer operations:

use the received one or more public datasets to train a task shared prompt; and use the trained task shared prompt and the user dataset to train a task specific prompt.

21. The CS of claim 20, wherein the task shared prompt and the task specific prompt are trained at an edge node, wherein the vector database is stored at a cloud location.

* * * * *